(12) United States Patent
Vitel et al.

(10) Patent No.: US 8,096,585 B2
(45) Date of Patent: Jan. 17, 2012

(54) TUBULAR JOINT

(75) Inventors: Jean-Pierre Vitel, Thiaucourt-Regnieville (FR); Philippe Renard, Fleville (FR); Daniel Grojean, Gondreville (FR)

(73) Assignee: Saint-Gobain PAM, Nancy (FR)

( * ) Notice: Subject to any disclaimer, the term of this patent is extended or adjusted under 35 U.S.C. 154(b) by 419 days.

(21) Appl. No.: 12/447,515

(22) PCT Filed: Oct. 26, 2007

(86) PCT No.: PCT/FR2007/001779
§ 371 (c)(1),
(2), (4) Date: Jul. 16, 2009

(87) PCT Pub. No.: WO2008/053100
PCT Pub. Date: May 8, 2008

(65) Prior Publication Data
US 2010/0090460 A1    Apr. 15, 2010

(30) Foreign Application Priority Data
Oct. 31, 2006    (FR) ...................... 06 54661

(51) Int. Cl.
*F16L 17/00*    (2006.01)

(52) U.S. Cl. ...................... 285/110; 277/609

(58) Field of Classification Search ............... 285/340, 285/104, 110, 374; 277/608, 609
See application file for complete search history.

(56) References Cited

U.S. PATENT DOCUMENTS

| | | | | |
|---|---|---|---|---|
| 4,637,618 A | * | 1/1987 | Valls | 277/626 |
| 4,693,483 A | * | 9/1987 | Valls | 277/626 |
| 4,826,028 A | * | 5/1989 | Vassallo et al. | 277/615 |
| 4,834,398 A | * | 5/1989 | Guzowski et al. | 277/624 |
| 5,064,207 A | * | 11/1991 | Bengtsson | 277/616 |
| 6,969,481 B2 | * | 11/2005 | Schnallinger | 264/266 |
| 7,140,618 B2 | * | 11/2006 | Valls, Jr. | 277/609 |
| 7,158,034 B2 | * | 1/2007 | Corbett, Jr. | 340/572.1 |
| 7,207,606 B2 | * | 4/2007 | Owen et al. | 285/339 |
| D557,386 S | * | 12/2007 | Darce | D23/269 |

(Continued)

FOREIGN PATENT DOCUMENTS

AU    694 988    8/1998

(Continued)

OTHER PUBLICATIONS

International Search Report dated May 28, 2008, from corresponding PCT application.

*Primary Examiner* — Aaron Dunwoody
(74) *Attorney, Agent, or Firm* — Young & Thompson

(57) ABSTRACT

This tubular joint includes a bell end (4) which is equipped with an internal groove (18) and in which is inserted a spigot end (6), a seal (8) and a locking element (12). The groove forms a groove wall (20). The spigot end (6) and the bell end (4) define a radial clearance (J). The locking element (12) includes a fixing tooth (36) and a contact face (28) for application against the wall (20) when the clearance (J) is within a first range of clearances. When the clearance is within a second range of clearances, the locking element (12) forms a rocking point (34) for rocking round the groove wall (20) and the fixing tooth (36) bites into the external surface (22) by a flying buttress effect of the locking element (12).

27 Claims, 8 Drawing Sheets

U.S. PATENT DOCUMENTS

| | | | |
|---|---|---|---|
| D559,363 S * | 1/2008 | Darce | D23/269 |
| 7,774,915 B2 * | 8/2010 | Darce et al. | 29/428 |
| 7,815,225 B2 * | 10/2010 | Jones et al. | 285/339 |
| 2004/0239110 A1 * | 12/2004 | Pedersen et al. | 285/255 |
| 2007/0216112 A1 | 9/2007 | Percebois et al. | |
| 2010/0244442 A1 * | 9/2010 | Jones et al. | 285/374 |

FOREIGN PATENT DOCUMENTS

| | | |
|---|---|---|
| EP | 0 433 202 | 6/1991 |
| EP | 0526373 | 2/1993 |
| EP | 0522 123 | 7/1993 |
| FR | 2 875 888 | 3/2006 |
| WO | 95/08072 | 3/1995 |

* cited by examiner

TUBULAR JOINT

FIELD OF THE INVENTION

The present invention relates to a tubular joint of the type comprising a bell end of a first pipe element, the bell end extending along a central axis, being equipped with an internal groove and a free extremity in which is inserted a spigot end of a second pipe element, the internal groove forming a truncated cone-shaped groove wall which forms a first angle with the central axis and is inclined to the central axis while narrowing toward the free extremity of the bell end, a seal disposed in the internal groove, at least one locking element adapted to lock the spigot end relative to the bell end, the spigot end and the bell end defining a radial clearance between themselves, this clearance being able to be situated either in a first range of clearances or in a second range of clearances, the clearances of the second range of clearances being smaller than the clearances of the first range of clearances.

It applies, in particular, to pipes conveying drinking water or waste water for sanitation.

BACKGROUND OF THE INVENTION

Tubular joints of this type are known in the prior art. When the tubular joint is in the fitted state and during use of the pipe, a fluid under pressure travels in the pipe elements. Under the influence of the fluid under pressure the spigot end and the bell end tend to separate from one another. In addition, the seal risks being extruded or even expelled from between the bell end and the spigot end.

Known tubular joints comprise locking elements which are adapted to lock the spigot end relative to the bell end and thus prevent the axial separation between the assembled pipe elements.

On the one hand, locking elements which cooperate exclusively by sliding with the internal groove of the bell end are known. If there is a slight clearance between the bell end and the spigot end, however, these locking elements require a significant fitting force since the axial displacement of the locking elements during insertion of the spigot end necessitates the compression of a large volume of elastomer. In addition, these tubular joints do not allow a significant angular offset between the spigot end and the bell end.

Locking elements which are immersed in the elastomer and operate exclusively by the arch-buttress effect between the spigot end and the bell end by means of rocking of the locking element are also known. These locking elements require significant fitting forces if there is a slight clearance between the bell end and the spigot end. In addition, if the clearance between the pipe elements is great and if the internal pressure is high, there is the risk that the locking element will not resist the recoil of the spigot end and will turn back completely, making the lock inoperative.

The object of the invention is to overcome these drawbacks and to propose a tubular joint which reduces the forces involved in fitting the spigot end in the bell end and allows effective locking in a wide range of clearances.

SUMMARY OF THE INVENTION

The invention accordingly relates to a tubular joint of the aforementioned type which is characterised in that the locking element comprises at least one main fixing tooth adapted to bite into an external surface of the spigot end and a contact face which, when the seal is unstressed, is inclined at a second angle relative to the central axis, this second angle being substantially identical to the first angle of inclination, and which is adapted to be applied to the groove wall and to achieve locking by a wedge effect during pressurisation and when the clearance lies in the first range of clearances, and in that, during pressurisation and when the clearance lies in the second range of clearances, the locking element is adapted to form a rocking point of this element around the groove wall, and the main fixing tooth is adapted to bite into the external surface by the arch-buttress effect of the locking element between the spigot end and the bell end.

According to particular embodiments, the tubular joint comprises one or more of the following features:

when the clearance is in a first range of clearances, the contact face is adapted to be applied in a planar manner and to slide on the groove wall when the spigot end is retracted from the bell end in the direction tending to remove the spigot end from the bell end, the locking element moving axially toward the free extremity and radially toward the interior by sliding of the contact face on the groove wall;

when the contact face of the locking element is applied to the groove wall, the main fixing tooth extends substantially radially toward the interior relative to the central axis;

the locking element comprises an internal face which, when the radial clearance is a minimal clearance, extends substantially parallel to the central axis, the minimal clearance constituting a lower limit of the second range of clearances;

the locking element comprises a stop adapted to limit the penetration of the main fixing tooth in the spigot end;

the stop extends axially away from the free extremity of the bell end;

the locking element comprises an auxiliary fixing tooth which is axially offset from the main fixing tooth in the direction toward the free extremity of the bell end and in that the auxiliary fixing tooth is adapted to fix onto the external surface of the spigot end when the clearance is close to the minimal clearance;

the auxiliary fixing tooth comprises an auxiliary fixing surface which is directed away from the free extremity of the bell end and which forms an angle with the internal face of the locking element;

the main fixing tooth has a non-rectilinear shape, in particular it is shaped as an arc of a circle;

the main fixing tooth has a rectilinear shape;

the tubular joint comprises at least one anti-extrusion element which is adapted to prevent the extrusion of the seal between the spigot end and the bell end;

the anti-extrusion element is made of plastics material having a resistance to deformation which is greater than that of the material of the seal, in particular of polyamide, polyethylene or polypropylene;

the anti-extrusion element is fixed to the seal;

the anti-extrusion element is disposed circumferentially between two locking elements;

the anti-extrusion element carries one of the locking elements;

the locking element delimits a gap from the anti-extrusion element supporting it, this gap imparting mobility to the locking element relative to the seal;

the locking element is produced from a material of which the hardness is greater than that of the material of the spigot end, in particular from metal;

the tubular joint comprises at least one circumferential spacer which is made of resilient material, in particular is integral with the seal, the spacer being disposed between a locking element and another adjacent locking element or an adjacent anti-extrusion element;

the locking element is fixed to the seal or to an anti-extrusion element by means of at least one fastening member, in particular a screw or an anchor stud;

the locking elements has a substantially triangular cross-section;

the locking element forms a connecting face adjacent to the seal; and the first angle is between 10° and 55°;

BRIEF DESCRIPTION OF THE DRAWINGS

The invention will be understood better on reading the following description which is given merely as an example with reference to the accompanying drawings, in which.

DETAILED DESCRIPTION OF THE INVENTION

Figure 1:
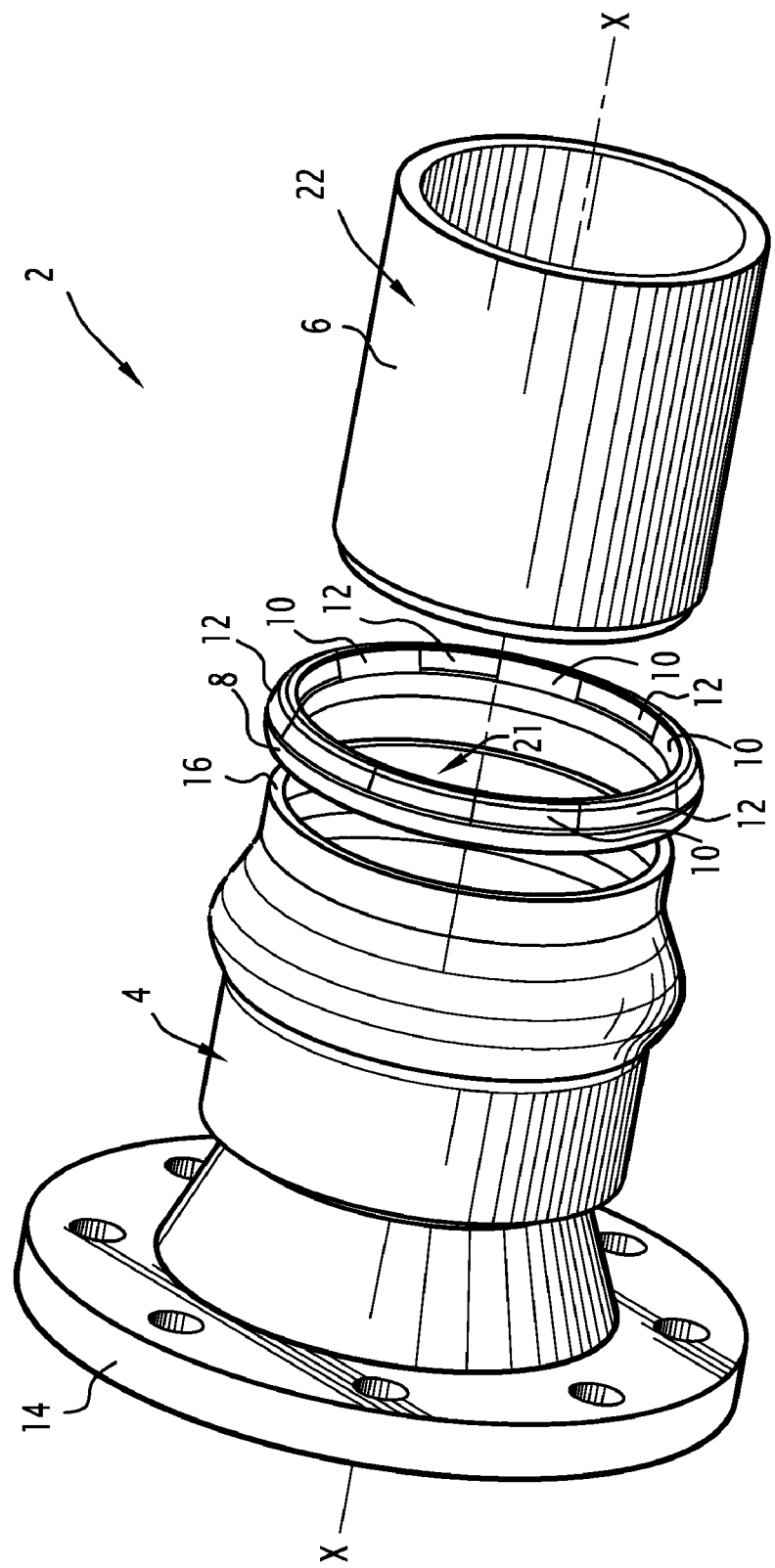
FIG. 1 is a prospective view of a tubular joint according to the invention in the unassembled state.

FIG. 1 shows a tubular joint according to the invention which is designated by the general reference numeral 2.

The tubular joint 2 comprises a first pipe element equipped with a bell end 4, a second pipe element with a spigot end 6, a seal 8, anti-extrusion elements 10 and locking elements 12.

The tubular joint 2 defines a central axis X-X. The terms "axially", "radially" and "circumferentially" will be used hereinafter with reference to this central axis X-X.

The bell end 4 and the spigot end 6 are produced, for example, from cast iron. In addition, these pipe elements may be coated with a protective layer (not shown).

The bell end 4 comprises a fixing flange 14 for connection to a pipe element (not shown) equipped with a corresponding flange, as well as a free extremity 16 which is turned toward the spigot end 6 in the unassembled state. The bell end 4 further comprises an internal annular groove 18 (see FIG. 2). In this instance, the internal groove 18 has a cross-section which is substantially in the shape of an arc of a circle, but it can have other shapes, for example a rectangular section. It forms a groove wall 20 which is inclined to the central axis X-X. The wall 20 is truncated cone-shaped and narrows toward the free extremity 16 of the bell end. It forms an angle α with the central axis X-X which is between about 10° and 55°.

Figure 3:
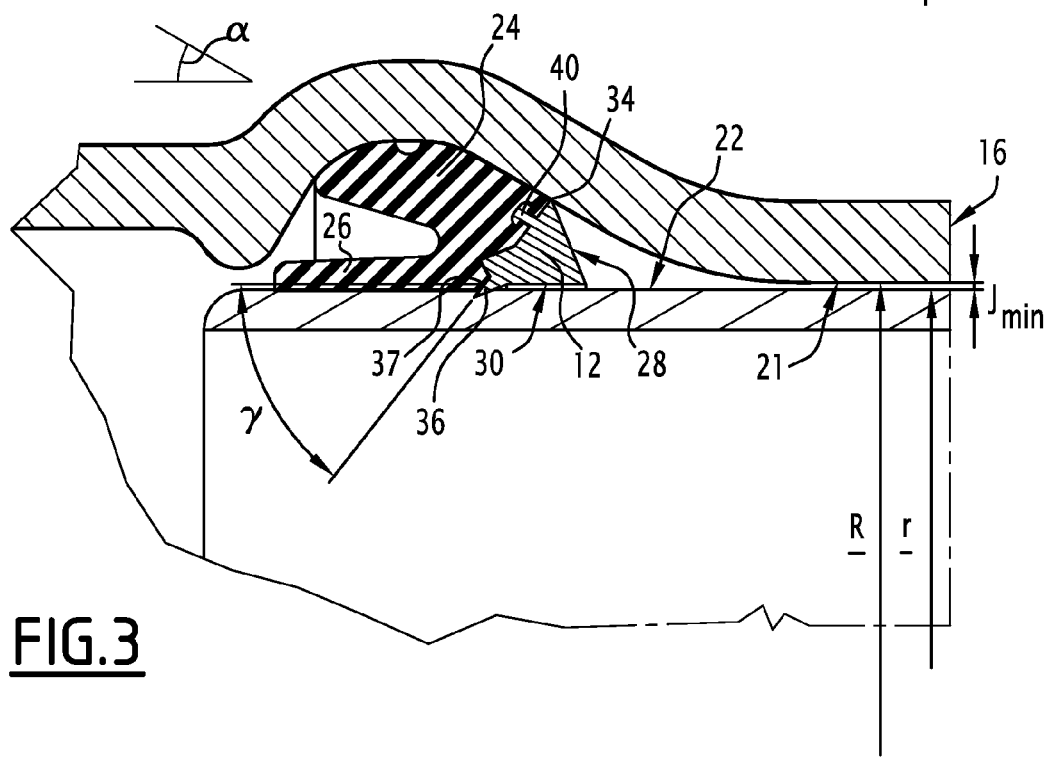
FIGS. 3 to 5 are views corresponding to that in FIG. 2, the tubular joint being in the assembled state in the case of various clearances formed between the spigot end and the bell end.

Referring to FIG. 3, the seal 8 which is equipped with the anti-extrusion elements 10 and the locking elements 12 is inserted into the internal groove 18 of the bell end in the assembled state of the tubular joint 2. The seal 8 is disposed axially on the side facing the fixing flange 14 whereas the locking elements 12 and the anti-extrusion elements 10 fixed to the seal 8 are disposed axially on the side facing the free extremity 16.

The bell end 4 has a radially internal surface 21 which extends between the free extremity 16 and the groove wall 20. This surface 21 is substantially cylindrical and is defined by a radius R around the axis around the axis X-X. The spigot end 6 has a cylindrical radially external surface 22 defined by a radius r around the axis X-X. During manufacture of the bell end 4 and the spigot end 6, the radii R and r are within a range of manufacturing tolerances. As a result, the internal surface 21 and the external surface 22 delimit a clearance J=R−r therebetween. Depending on the manufacturing tolerances, this clearance J lies between a maximum clearance $J_{max}$ (see FIG. 5) which is obtained when the radius R is the maximum and the radius r is the minimum, as well as a minimum clearance $J_{min}$ (see FIG. 3) which is obtained when the radius R is the minimum and the radius r is the maximum.

More commonly, however, the clearance between the spigot end and the bell end is a medium clearance $J_{med}$ (see FIG. 4) which lies between the maximum clearance $J_{max}$ and the minimum clearance $J_{min}$.

The seal 8 is produced, for example, from rubber. It comprises a base body 24 and a sealing lip 26.

Each locking element 12 is an element produced from a material which is harder than the surface of the spigot end 6, such as metal. The locking element 12 has a generating cross-section shown in FIG. 1 which, apart from the fixings studs 40 (see below), extends over an entire arc of a circle round the central axis X-X. The locking element 12 covers an angular range round the central axis X-X which is preferably between 10° and 50°. In the embodiment shown, five locking elements 12 are uniformly distributed round the axis X-X, with each locking element 12 covering an angular range of approximately 36° (see FIG. 1).

Figure 2:
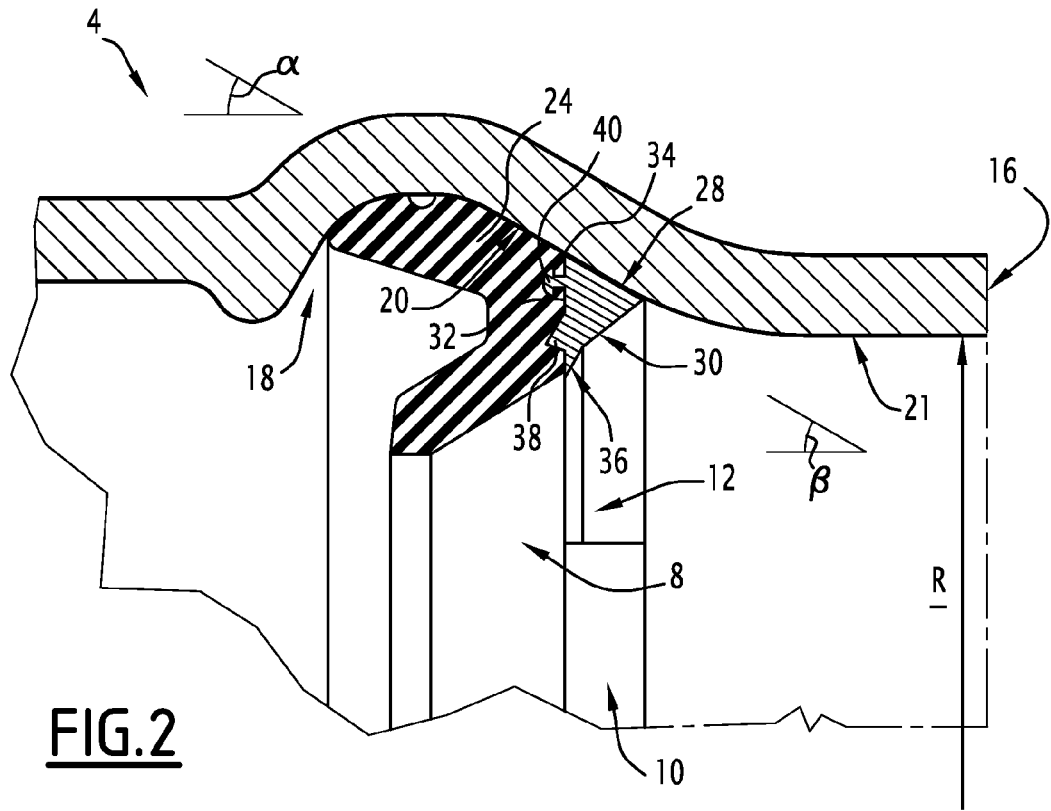
FIG. 2 is a longitudinal section of a portion of the tubular joint from FIG. 1 prior to insertion of the spigot end, the seal being disposed in the bell end and the spigot end being omitted.

Referring to FIG. 2 which shows the position of the seal in the unstressed state, the cross-section of the locking element 12 is substantially triangular. The locking element 12 thus forms a truncated cone-shaped contact face 28 having a component which is directed radially outwards, a radially internal face 30 and a connection face 32 which is adjacent to the seal 8 and connects the locking element 12 to the seal 8. In the configuration shown in FIG. 2, the contact face 28 is inclined at an angle β to the axis X-X, this angle being substantially identical to the angle of inclination α of the groove wall 20 relative to the central axis X-X. The contact face 28 is thus applied in a planar manner to the wall 20. In the unstressed state of the seal 8, the connection face 32 extends radially relative to the central axis X-X. Furthermore, the contact face 28 and the connection face 23 form, at their joint, in a radial section, a rocking point 34 allowing the locking element 12 to rock round the groove wall 20.

In the region of the joint between the internal face 30 and the connection face 32, the locking element 12 comprises a main fixing tooth 36 adapted to bite into the external surface 22 of the spigot end. This tooth comprises a main fixing surface 37 which is directed away from the free extremity 16 and forms an angle γ with the internal face 30 of the locking element.

Finally, the locking element 12 is equipped with a stop 38 adapted to limit the penetration of the main fixing tooth 36 into the spigot end 6. The stop 38 extends axially away from the free extremity of the bell end and projects from the connection face 32.

The locking element 12 is fixed to the seal 8. For this purpose, the locking element 12 carries one or more anchor studs 40 which project on the connection face 32. Each stud 40 is fixed to the seal 8 by over-moulding.

To guarantee relative mobility of the locking element 12, the locking element 12 is fixed to the seal 8 only by the anchor stud 40. The region of contact between the connection surface 32 and the seal has no other binder.

As shown in FIG. 1, the anti-extrusion elements 10 have a strictly triangular cross-section which substantially corresponds to that of the locking element 12. However, the cross-section of the anti-extrusion element does not have the main fixing tooth 36 and the stop 38. The anti-extrusion elements 10 have the shape of the arc of a circle around the central axis X-X and extend circumferentially between two adjacent locking elements 12. The anti-extrusion elements 10 in combination with the locking elements 12 therefore prevent the elastomer of the seal 8 from being extruded outwards through the annular space delimited by the external surface 22 of the spigot end 6 and the internal surface 21 of the bell end 4 when the pipe elements are pressurised.

The anti-extrusion elements 10 are preferably produced from a plastics material such as polyamide, polyethylene or polypropylene.

The anti-extrusion elements 10 are fixed to the seal 8 by any suitable means. They may be fixed, in particular, by gluing, over-moulding, click-locking, screwing or riveting.

The tubular joint according to the invention is assembled in the following manner.

First of all, the anti-extrusion elements 10 and the locking elements 12 are fixed to the seal 8. The seal 8, the locking elements 12 and anti-extrusion elements 10 can therefore be handled as a single unit. The seal 8 equipped with the locking elements 12 and the anti-extrusion elements 10 is then manually placed in the internal groove 18. The joint thus assumes the configuration shown in FIG. 2.

During insertion of the spigot end 6 into the bell end 4, the locking element 12 rocks in a clockwise direction in FIG. 2 and the sealing lip 26 is compressed radially outwards, thus leading after a fitting, to a configuration in which the internal face 30 is substantially parallel to the external surface 22 of the spigot end, with the main fixing tooth 36 resting against the external surface 22 but without biting into it. This is particularly advantageous in the case of a spigot end 6 equipped with an external protective coating, because the fact that the locking element 12 has relative mobility and is not immersed in the elastomer limits the counter-thrust of the elastomer compressed on the locking element 12 during the fitting of the spigot end and thus reduces the risk of fixing the main tooth 36 in the external surface 22 of the spigot end, thus preventing damage to the external coating.

The operation of the locking elements 12 when the joint is pressurised differs as a function of the radial clearance J existing between the internal surface 21 and the external surface 22.

Figure 5:
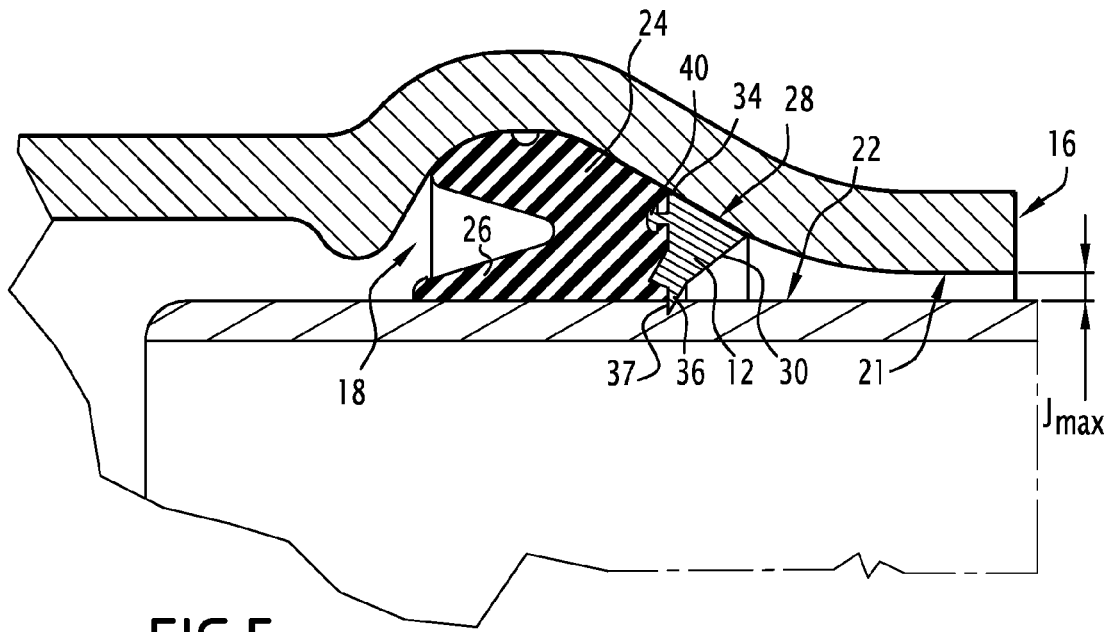

If the clearance J lies within a first range of clearances in which the clearances are great and may be as high as the clearance $J_{max}$ in FIG. 5, operation is as follows.

During the recoil of the spigot end 6 under the influence of a high internal pressure, the locking element 12 firstly pivots in an anticlockwise direction round the main fixing tooth 36 which rests on the external surface 22 of the spigot end 6 and thus forms a rocking point, until its contact face 28 rests against the groove wall 20. The locking element 12 thus moves axially toward the free extremity 16 of the bell end 4 and radially toward the interior due to sliding of the contact face 28 on the groove wall 20, thus causing the progressive penetration of the fixing tooth 36 of the locking element 12 into the external surface 22 of the spigot end 6 until locking is achieved due to the wedge effect. A locking configuration of the type shown, for example, in FIG. 5 which corresponds to the case of the clearance $J_{max}$ is thus obtained.

Advantageously, the stop 38 which projects axially toward the interior of the bell end 4 limits the penetration of the fixing tooth 36 in the spigot end 6 in order to prevent excessive penetration which is liable to damage the spigot end.

If the clearance J lies in a second range of lesser clearances corresponding to clearances which are smaller than the clearances of the first range of clearances and encompassing, in particular, the clearance $J_{min}$ (see FIG. 3) and the clearance $J_{med}$ (see FIG. 4), operation is as follows.

During the recoil of the spigot end 6 under the influence of the internal pressure, the locking element 12 first pivots in an anti-clockwise direction round the main fixing tooth 36 which is resting on the external surface 22 of the spigot end 6 and thus forms a rocking point, until the rocking point 34 rests against the groove wall 20 of the bell end 4. At this moment, the locking element 12 pivots in an anticlockwise direction round the rocking point 34, thus causing the gradual penetration of the main fixing tooth 36 into the external surface 22 of the spigot end 6 until the locking element 12 forms a flying buttress between the spigot end 6 and the bell end 4 by means of the fixing tooth 36 and the rocking point 34 respectively, thus producing locking by a arch-buttress effect.

Figure 4:
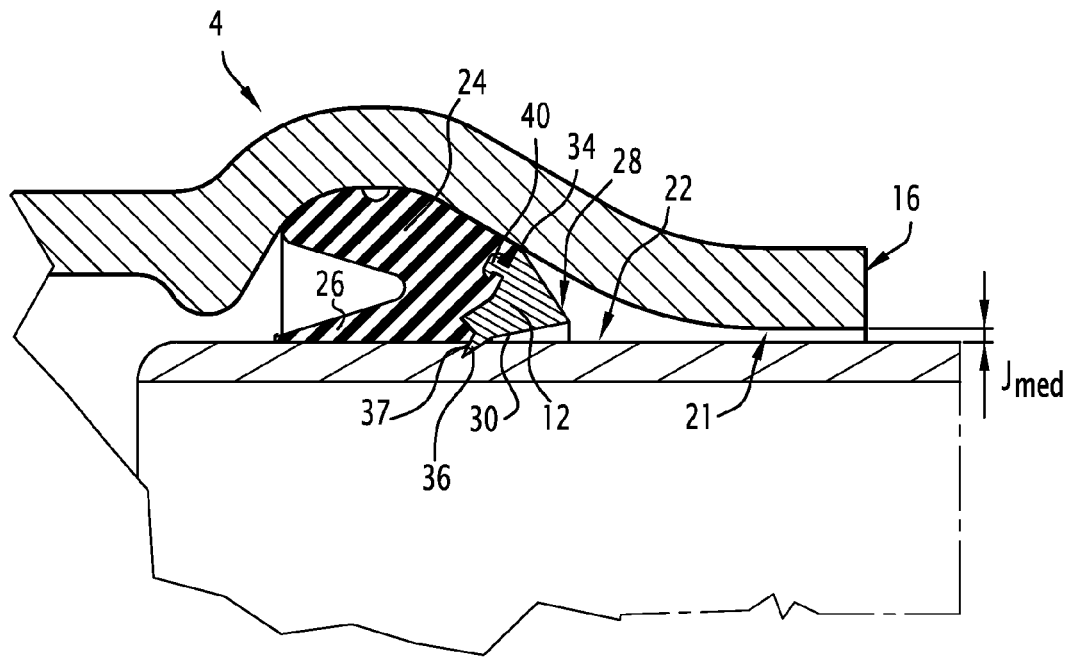

In the locking configuration with clearance $J_{min}$ shown in FIG. 3, the internal face 30 of the locking element 12 is substantially parallel to the external surface 22 of the spigot end, whereas in the locking configuration with clearance $J_{med}$ in FIG. 4, the internal face 30 of the locking element forms an angle with the external surface 22.

In the described embodiment, the angle between the faces 32 and 28 forming the rocking point 34 is an acute angle which facilitates anchoring of the rocking point 34 in the groove 18 of the bell end 4 in order to form a stable centre of rotation.

Figure 6:
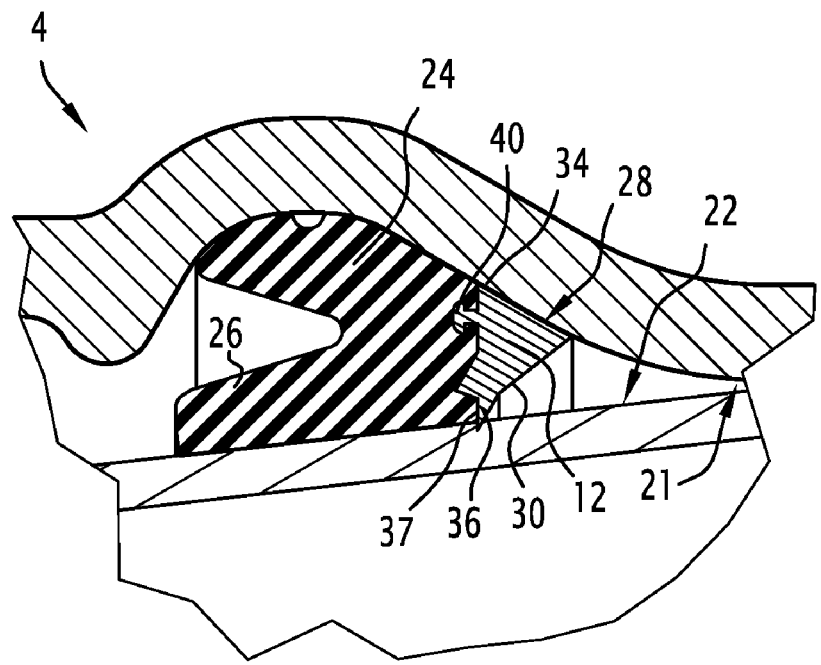
FIG. 6 is a view similar to that in FIG. 5, the spigot end being offset at an angle from the bell end.

FIG. 6 shows the joint with an angular offset between the spigot end 6 and the bell end 4. It will be appreciated that the provision of a single main fixing tooth 36 allows the spigot end 6 and the bell end 4 to be locked reliably even in the case of significant angular offsets.

Figure 7:
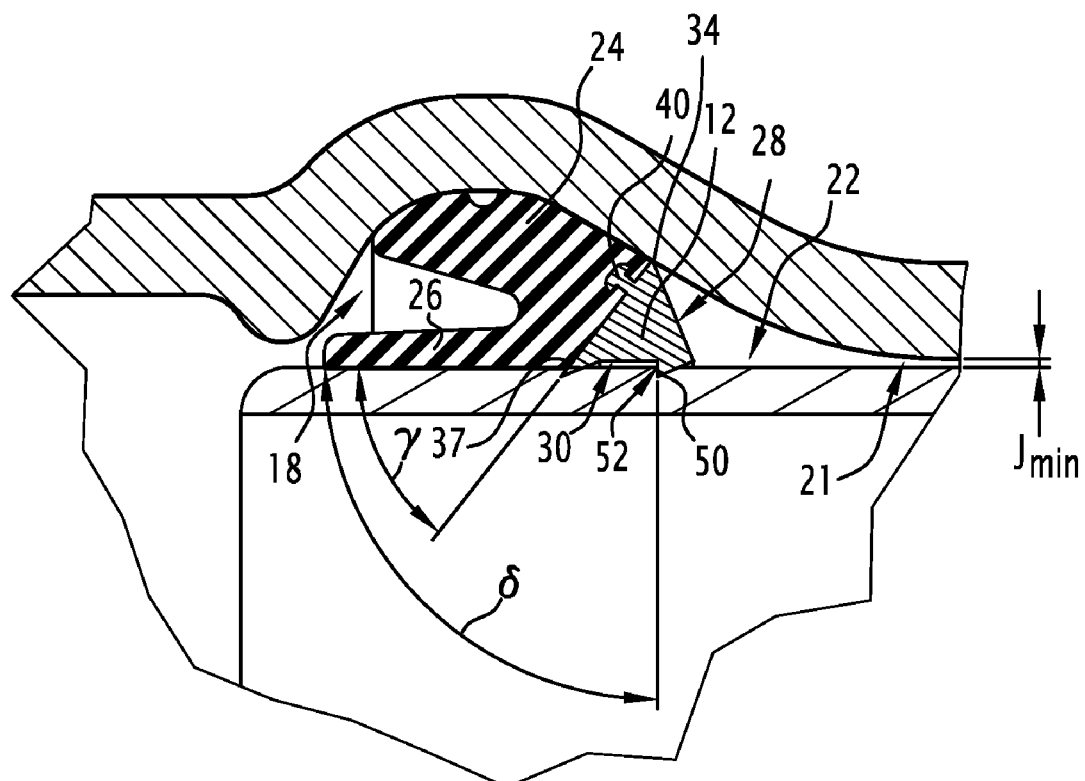
FIG. 7 is a view similar to that in FIG. 3 showing a second embodiment of the tubular joint according to the invention and comprising an auxiliary fixing tooth.

FIG. 7 shows a second embodiment of the tubular joint according to the invention which differs from the joint as follows.

Advantageously, the radially internal face 30 of the locking insert 12 is equipped with an auxiliary fixing tooth 50. this auxiliary tooth 50 is disposed remotely from the main fixing tooth 36, that is to say on the side of the free extremity 16 of the bell end 4. This auxiliary fixing tooth 50 is adapted to guarantee locking when the clearance J is small, that is to say close to the minimum clearance $J_{min}$, while thus opposing the sliding of the main fixing tooth 36 on the external surface 22 of the spigot end 6, this risk of sliding potentially being high with slight clearance owing to the small angle of inclination to the external surface 22 of the bearing reaction in the region of this fixing tooth 36. The auxiliary fixing tooth 50 comprises an auxiliary fixing surface 52 which forms an auxiliary angle δ with the internal face 30 of the locking element. This auxiliary angle δ is greater than the angle γ.

Figure 8:
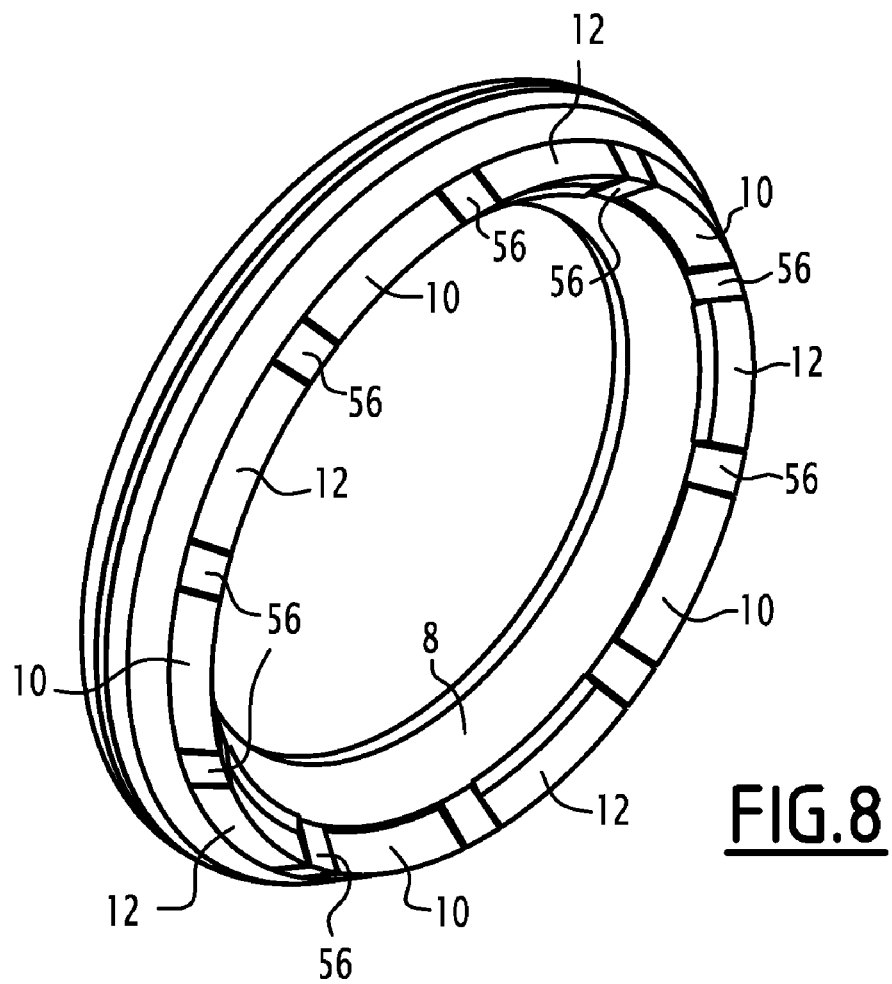
FIG. 8 is a perspective view of a seal equipped with locking elements and anti-extrusion elements of a tubular joint according to a third embodiment of the invention.
Figure 9:
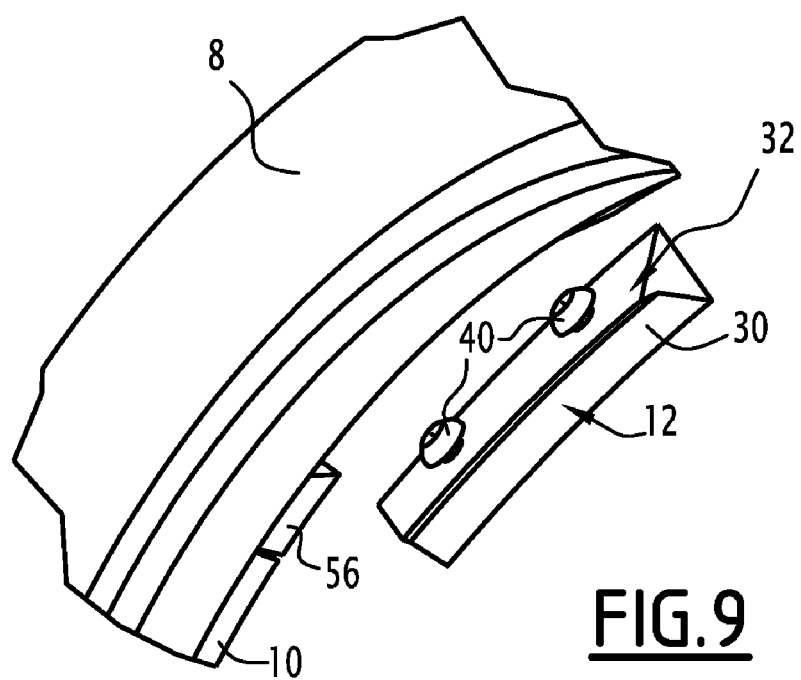
FIG. 9 is a view of a portion of the seal from FIG. 8 in the unassembled state.

According to a third embodiment described with reference to FIGS. 8 and 9, the anti-extrusion elements 10 are inserted between the locking elements 12 which are uniformly distributed round the periphery of the seal 8. The anti-extrusion elements 10 are separated from the locking elements 12 by a circumferential spacer 56 which is integral with the seal 8, this spacer 56 having a small circumferential dimension so as not to be extruded under the influence of the internal pressure. These spacers improve the resilience of the seal 8 and thus facilitate the deformation thereof for the introduction thereof into the bell end.

With regard to fastening, the locking elements 12 and the anti-extrusion elements 10 are equipped with anchor studs 40 which are integral with the connection face 32, these studs 40 being over-moulded in the elastomer of the seal 8. Advantageously, the anchor studs 40 are covered with an adhesive beforehand to allow the studs 40 to adhere to the elastomer after injection thereof into the mould. As a result, it is impossible to remove the locking elements 12 and the anti-extrusion elements 10 once the seal 8 has been moulded. It will be noted, however, that the locking elements 12 advantageously maintain some resilience or mobility relative to the seal in so far as only the anchor studs 40 are connected to the elastomer. The connection face 32 is disposed freely on the seal 8 for this purpose.

Figure 10:
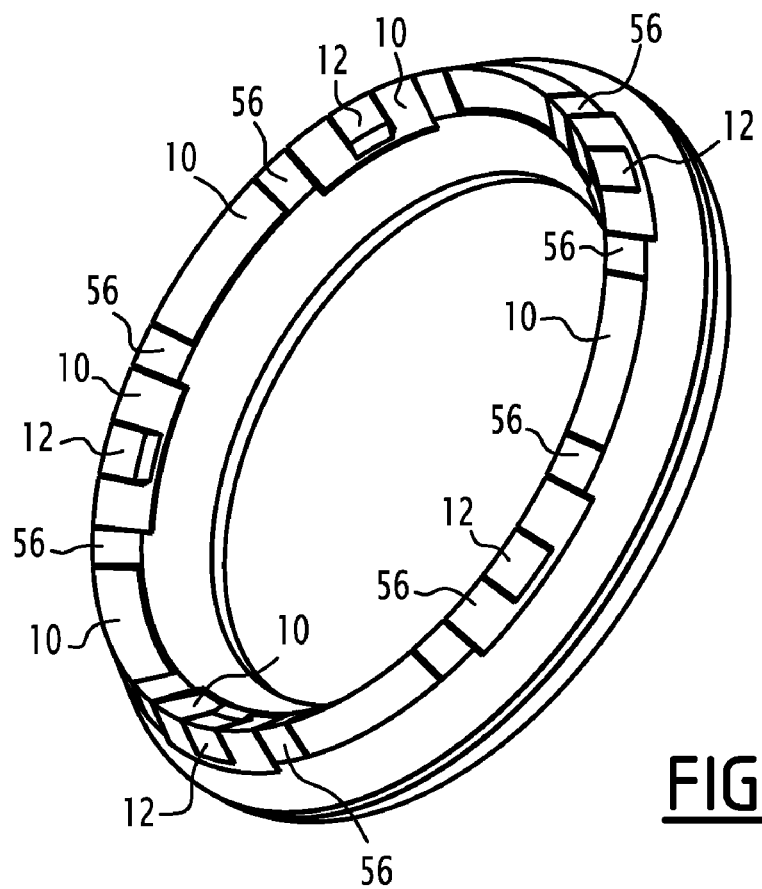
FIG. 10 is a perspective view of a seal of a tube joint according to a fourth embodiment of the invention.
Figure 11:
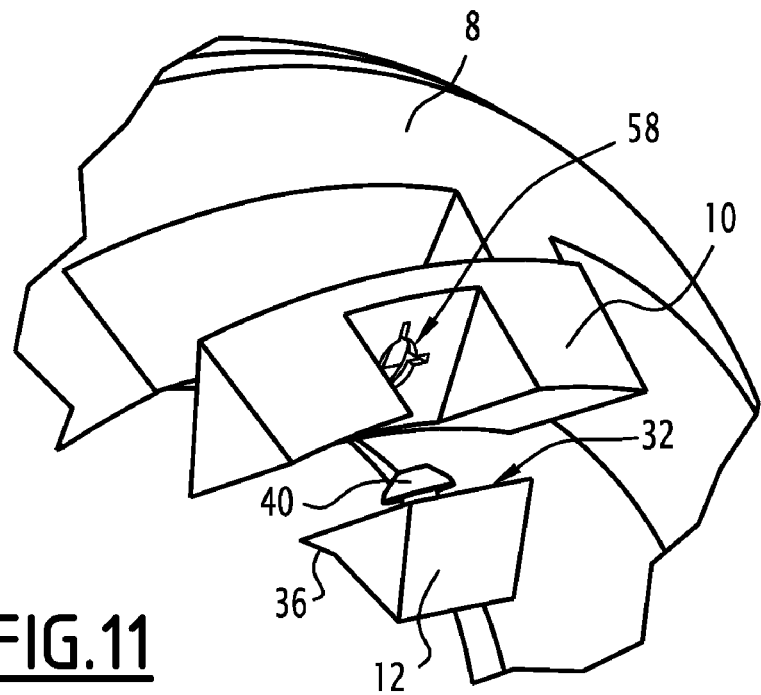
FIG. 11 is a perspective view of a portion of the seal from FIG. 10 in the unassembled state.

In the fourth embodiment, described with reference to FIGS. 10 and 11, the seal 8 carries two rows of anti-extrusion elements which, in an axial view, have the general shape of segments of an arc of a circle and comprise a connection face for connection to the seal 8. The elements 10 of the first row have a solid section and are identical to those described hereinbefore. The anti-extrusion elements 10 of the second row have the function of supporting the locking elements 12. For this purpose, each locking element 12 has a snap-lock stud 40 for snap-locking the locking element 12 in a mating receiving recess 58 in the anti-extrusion element 10 of the second row which acts as its support. To obtain the seal according to the fourth embodiment, the locking elements 12 are first clipped onto the associated anti-extrusion elements 10, the plastics connection face of all the anti-extrusion elements 10 is then coated with an adhesive and the elastomer of the seal 8 is finally injected once these elements 10 have been positioned in a mould. As a result, despite the adhesion of the anti-extrusion elements 10 to the elastomer, the locking elements 12 themselves maintain some resilience or flexibility insofar as they are merely clipped on the anti-extrusion elements 10 supporting them.

In addition, as the locking elements 12 are mounted on the anti-extrusion elements 10 in the second row, it is not necessary for them to match the profiles of the spigot end 6 and the bell end, in contrast to the above-described embodiments in which the locking elements 12 are curved in an arc of a circle. In this embodiment, therefore, the locking elements 12 have rectilinear internal and external profiles and, in particular, a rectilinear main fixing tooth 36. This is advantageous because the same locking element 12 can thus be used in a range of diametral tolerances on the pipes which is greater than the range of diametral tolerances permitted by the inwardly curved locking element 12 in FIGS. 1 to 9.

The fifth embodiment (see FIG. 12) differs from the fourth embodiment only by the method of fastening the locking elements 12 on the anti-extrusion elements 10 supporting them, fastening being effected by means of screws 40 instead of anchor studs. The head 40A of the screw 40 is disposed on the side turned toward the seal 8 and the threaded portion 40B of the screw 40 is screwed into a female thread of the locking element 12.

Figure 12:
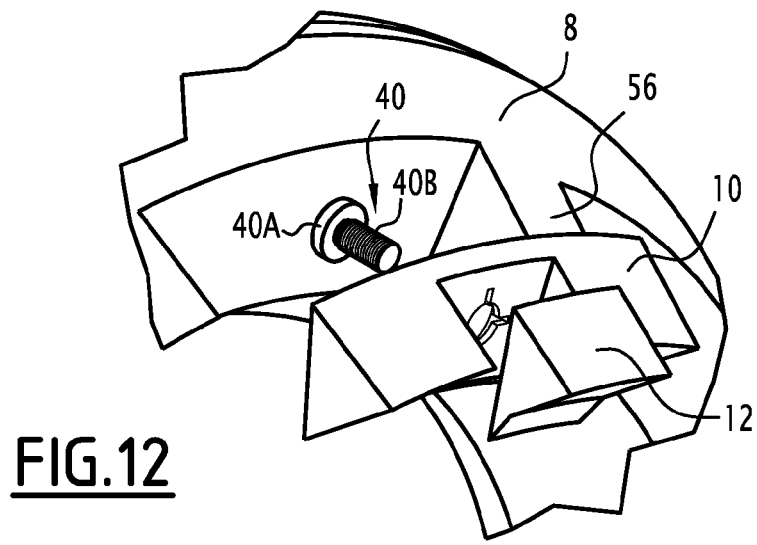
FIG. 12 is a perspective view in the unassembled state of a portion of a seal of a tubular joint according to a fifth embodiment of the invention.
Figures 13, 14:
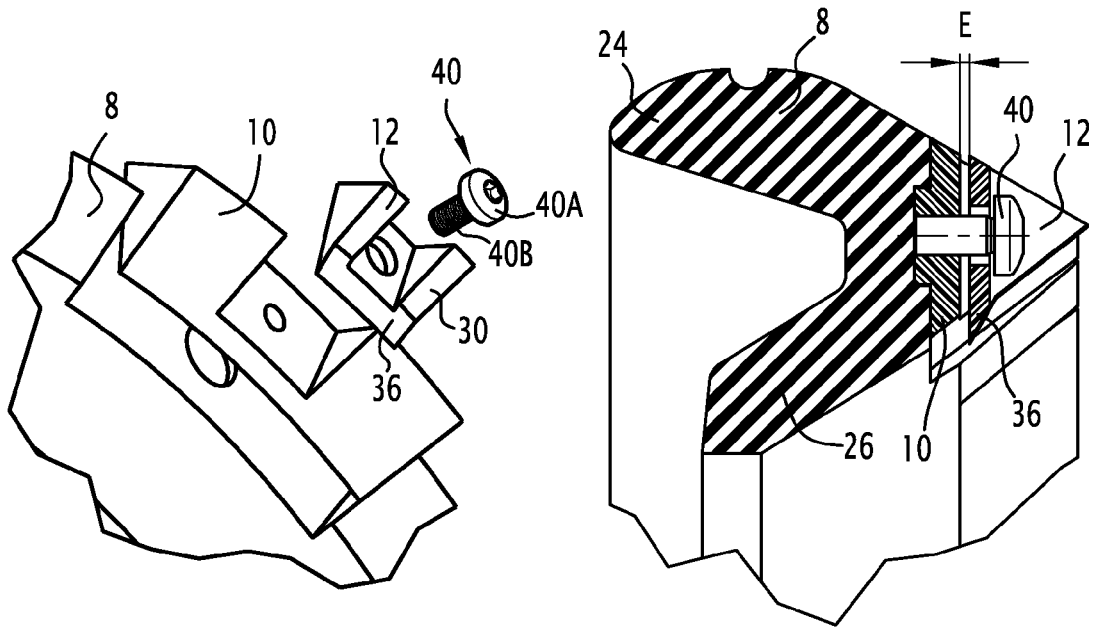
FIG. 13 is a perspective view of a portion of seal of a tubular joint according to a sixth embodiment of the invention, in the unassembled state.
FIG. 14 is a cross-sectional view of the seal from FIG. 13 in the assembled state.

The sixth embodiment shown in FIGS. 13 and 14 is a variation of that described with reference to FIG. 12, the locking element 12 being screwed onto its anti-extrusion support 10 in the opposite direction in this embodiment. The head 40A of the screw 40 is accommodated in a recess in the locking element 12 and the threaded portion 40B is screwed in a female thread of the anti-extrusion element 10. It should be noted, on the one hand, that the screw 40 of this sixth embodiment after over-moulding of the anti-extrusion elements 10, is not in contact with the elastomer, thus rendering the locking element 12 independent of the elastomer and, on the other hand, that, after screwing, there is a gap E between the locking element 12 and the anti-extrusion element 10, thus guaranteeing the locking element 12 total flexibility which facilitates the movements required by the locking element 12 for achieving the locking.

Figure 15:
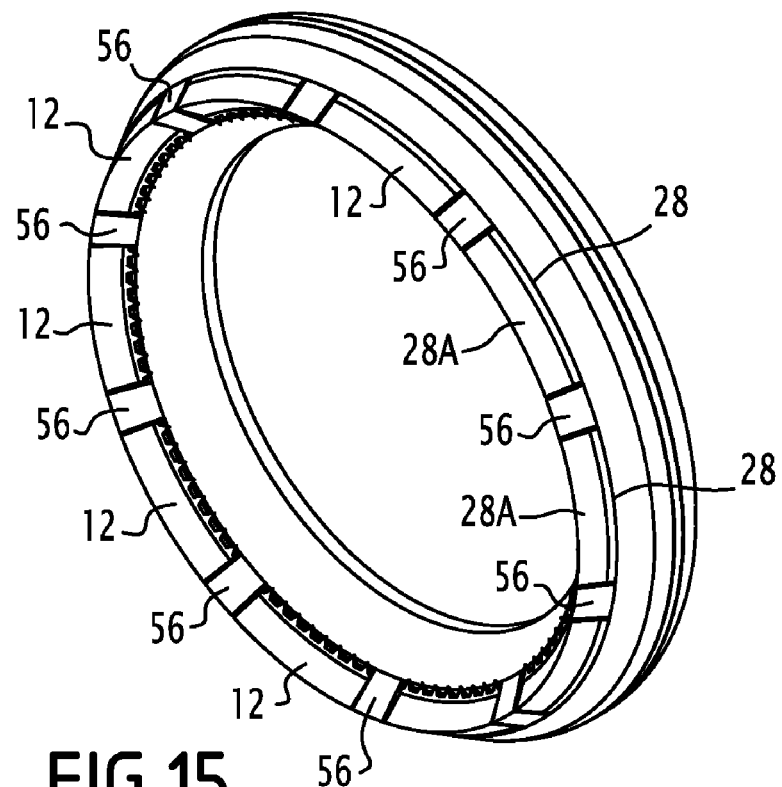
FIG. 15 is a perspective view of a seal of a tubular joint according to a seventh embodiment of the invention.
Figure 16:
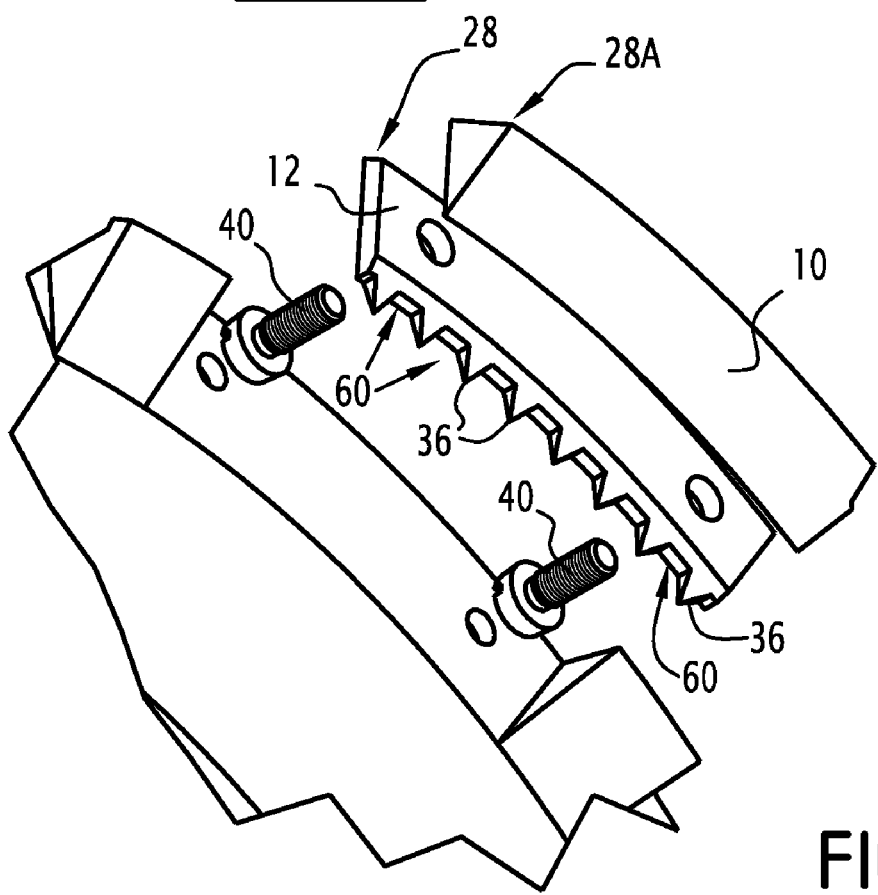
FIG. 16 is a perspective view of a portion of the seal from FIG. 15 in the unassembled state.

FIGS. 15 and 16 show a seventh embodiment. FIG. 15 is a perspective view of the seal 8 carrying the anti-extrusion elements 10 and the locking elements 12. FIG. 16 shows a portion of the seal 8, the elements 10 and 12 not being assembled. The seal 8 is equipped with locking elements 12 having the general shape of a planar arc of a ring. The locking elements 12 are formed from treated metal, for example from hardened steel, and are intended to lock the joint. An anti-extrusion element 10 of triangular section, which is intended to counteract the extrusion of the elastomer is fastened on the locking element 12. The anti-extrusion element 10 is made of rigid plastics material or of untreated metal, for example of mild steel. The two elements 10 and 12 are connected to one another by screws 40 of which the head 40A is over-moulded in the elastomer of the seal 8.

The locking element 12 constitutes a segment in the form of an arc of a circle of which the radially internal edge constitutes fixing gear teeth having a plurality of main fixing teeth 36 which are circumferentially offset and separated from one another by spacing grooves 60. In this case, the radially internal surface formed by each spacing groove 60 between the teeth 36 allows the penetration of the teeth 36 into the spigot end 6 to be limited and thus advantageously replaces the stop 38 described with reference to the first embodiment.

In a variation, the circumferential gear teeth may be replaced by a continuous tooth 36 as in the case of the above-described locking elements 12.

The locking element 12 is sandwiched between the anti-extrusion element 10 and the seal 8. The two assembled elements 10 and 12 have, in section, a triangular general shape which is substantially identical to that of the foregoing locking elements 12. The contact face 28 of the locking element 12 is thus extended by an additional contact face 28A integral with the anti-extrusion element 10.

It will be noted, however, that the locking element 12 has a reduced axial thickness here, thus allowing the cost of the locking elements 12 to be reduced significantly in comparison with the cost of the locking elements 12 described with reference to FIGS. 1 to 9.

Finally, if this embodiment in FIGS. 15 and 16 exclusively comprises locking elements 12 which are each equipped with an anti-extrusion element and are uniformly distributed round the periphery of the seal 8, the positioning of anti-extrusion elements 10 without any locking elements between two successive locking elements of this type can also be envisaged, as in the foregoing embodiments.

It should be noted that the various features described in conjunction with a specific embodiment can similarly be applied to other embodiments.

It will finally be noted that the fitting of the composite locking seal according to the invention into the internal groove 18 of the bell end 4, prior to insertion of the spigot end 6, is carried out manually by merely deforming the seal 8 into a cardioid so that it can be easily introduced into the narrow free extremity 16 of the bell end 4.

The invention claimed is:

1. Tubular joint comprising
   a bell end (4) of a first pipe element, the bell end (4) extending along a central axis (X-X), being equipped with an internal groove (18) and a free extremity (16) in which is inserted a spigot end (6) of a second pipe element, the internal grove (18) forming a truncated cone-shaped groove wall (20) which forms a first angle ($\alpha$) with the central axis and is inclined to the central axis (X-X) while narrowing toward the free extremity (16) of the bell end (4),
   a seal (8) disposed in the internal groove (18),
   at least one locking element (12) adapted to lock the spigot end (6) relative to the bell end (4),
   the spigot end (6) and the bell end (4) defining a radial clearance (J) between themselves, this clearance being able to be situated either in a first range of clearances or in a second range of clearances, the clearances of the second range of clearances being smaller than the clearances of the first range of clearances,
   characterised in that the locking element (12) comprises at least one main fixing tooth (36) adapted to bite into an external surface (22) of the spigot end (6) and a contact face (28) which, when the seal is unstressed, is inclined at a second angle ($\beta$) relative to the central axis (X-X), this second angle ($\beta$) being substantially identical to the first angle of inclination, and which is adapted to be applied to the groove wall (20) and to achieve locking by a wedge effect during pressurisation and when the clearance (J) lies in the first range of clearances, and
   in that, during pressurisation and when the clearance lies in the second range of clearances, the locking element (12) is adapted to form a rocking point (34) of this element (12) around the groove wall (20), and the main fixing tooth (36) is adapted to bite into the external surface (22) by the arch-buttress effect of the locking element (12) between the spigot end (6) and the bell end (4).

2. Tubular joint according to claim 1, characterised in that, when the clearance (J) is in a first range of clearances, the contact face (28) is adapted to be applied in a planar manner and to slide on the groove wall (20) when the spigot end (6) is retracted from the bell end (4) in the direction tending to remove the spigot end from the bell end (4), the locking element (12) moving axially toward the free extremity (16) and radially toward the interior by sliding of the contact face (28) on the groove wall.

3. Tubular joint according to claim 1, characterised in that, when the contact face (28) of the locking element (12) is applied to the groove wall (20), the main fixing tooth (36) extends substantially radially toward the interior relative to the central axis (X-X).

4. Tubular joint according to claim 1, characterised in that the locking element (12) comprises an internal face (30) which, when the radial clearance is a minimal clearance ($J_{min}$) extends substantially parallel to the central axis (X-X), the minimal clearance constituting a lower limit of the second range of clearances.

5. Tubular joint according to claim 1, characterised in that the locking element (12) comprises a stop (38) adapted to limit the penetration of the main fixing tooth (36) in the spigot end (6).

6. Tubular joint according to claim 5, characterised in that the stop (38) extends axially away from the free extremity (16) of the bell end (4).

7. Tubular joint according to claim 1, characterised in that the locking element (12) comprises an auxiliary fixing tooth (50) which is axially offset from the main fixing tooth (36) in the direction toward the free extremity (16) of the bell end (4) and in that the auxiliary fixing tooth (50) is adapted to fix on to the external surface (22) of the spigot end (6) when the clearance (J) is close to the minimal clearance ($J_{min}$).

8. Tubular joint according to claim 7, characterised in that the auxiliary fixing tooth (50) comprises an auxiliary fixing surface (52) which is directed away from the free extremity (16) of the bell end (4) and which forms an angle (5) with the internal face (30) of the locking element (12).

9. Tubular joint according to claim 1, characterised in that the main fixing tooth (36) has a non-rectilinear shape.

10. Tubular joint according to claim 1, characterised in that the main fixing tooth (36) has a rectilinear shape.

11. Tubular joint according to claim 1, further comprising at least one anti-extrusion element (10) which is adapted to prevent the extrusion of the seal (8) between the spigot end (6) and the bell end (4).

12. Tubular joint according to claim 11, characterised in that the anti-extrusion element (10) is made of plastics material having a resistance to deformation which is greater than that of the material of the seal (8).

13. Tubular joint according to claim 11 characterised in that the anti-extrusion element (10) is fixed to the seal (8).

14. Tubular joint according to claim 11, characterised in that the anti-extrusion element (10) is disposed circumferentially between two locking elements (12).

15. Tubular joint according to claim 11, characterised in that the anti-extrusion element (10) carries one of the locking elements (12).

16. Tubular joint according to claim 15, characterised in that the locking element (12) delimits a gap (E) from the anti-extrusion element (10) supporting it, this gap (E) imparting mobility to the locking element relative to the seal (8).

17. Tubular joint according to claim 1, characterised in that the locking element (12) is produced from a material of which the hardness is greater than that of the material of the spigot end (6).

18. Tubular joint according to claim 1, further comprising at least one circumferential spacer (56) which is made of resilient material, the spacer (56) being disposed between a locking element (12) and another adjacent locking element or an adjacent anti-extrusion element (10).

19. Tubular joint according to claim 1, characterised in that the locking element (12) is fixed to the seal (8) or to an anti-extrusion element (10) by means of at least one fastening member (40).

20. Tubular joint according to claim 1, characterised in that the locking element (12) has a substantially triangular cross-section.

21. Tubular joint according to claim 1, characterised in that the locking element (12) forms a connecting face (32) adjacent to the seal (8).

22. Tubular joint according to claim 1, characterised in that the first angle ($\alpha$) is between 10° and 55°.

23. Tubular joint according to claim 9, wherein the main fixing tooth (36) is shaped as an arc of a circle.

24. Tubular joint according to claim 12, wherein the anti-extrusion element (10) is made of polyamide, polyethylene or polypropylene.

25. Tubular joint according to claim 17, wherein the locking element (12) is produced from metal.

26. Tubular joint according to claim 18, wherein the at least one circumferential spacer (56) is integral with the seal.

27. Tubular joint according to claim 19, wherein the locking element (12) is fixed to the seal (8) or to an anti-extrusion element (10) by a screw or an anchor stud.

* * * * *